(12) United States Patent
Knight

(10) Patent No.: US 6,234,248 B1
(45) Date of Patent: *May 22, 2001

(54) WELL PRODUCTION APPARATUS

(76) Inventor: Roy F. Knight, P.O. Box 1516, Norman, OK (US) 73070

( * ) Notice: Subject to any disclaimer, the term of this patent is extended or adjusted under 35 U.S.C. 154(b) by 0 days.

This patent is subject to a terminal disclaimer.

(21) Appl. No.: 09/262,285

(22) Filed: Mar. 4, 1999

(51) Int. Cl.[7] .................................................. E21B 43/38
(52) U.S. Cl. ............................ 166/105.5; 166/66; 166/265
(58) Field of Search .............................. 166/66, 68, 90.1, 166/105.5, 53, 250.01, 765, 369, 370, 267

(56) References Cited

U.S. PATENT DOCUMENTS

| | | | |
|---|---|---|---|
| Re. 30,836 | 12/1981 | Bunnelle | 96/214 |
| Re. 34,111 | * 10/1992 | Wynn | 166/53 |
| 3,578,077 | * 5/1971 | Glenn, Jr. et al. | 166/68 |
| 3,791,444 | 2/1974 | Hickey | 166/54 |
| 4,074,763 | 2/1978 | Stevens | 166/325 |
| 4,231,767 | 11/1980 | Acker | 96/174 |
| 4,481,020 | 11/1984 | Lee et al. | 96/214 |
| 4,989,671 | * 2/1991 | Lamp | 166/53 |
| 5,078,213 | * 1/1992 | Canutt | 166/369 |
| 5,095,983 | * 3/1992 | Magnani | 166/250.01 |
| 5,207,897 | * 5/1993 | Baird et al. | 210/109 |
| 5,450,901 | * 9/1995 | Ellwood | 166/266 |
| 5,482,117 | * 1/1996 | Kolpak et al. | 166/265 |
| 5,547,021 | * 8/1996 | Raden | 166/250.07 |
| 5,911,278 | * 6/1999 | Reitz | 166/372 |
| 5,961,841 | * 10/1999 | Bowers | 210/739 |
| 5,988,275 | * 11/1999 | Brady et al. | 166/105.5 |
| 5,996,690 | * 12/1999 | Shaw et al. | 166/250.01 |
| 6,000,468 | * 12/1999 | Pringle | 166/53 |
| 6,026,901 | * 2/2000 | Brady et al. | 166/265 |
| 6,039,166 | * 3/2000 | Stevenson et al. | 166/263 |

* cited by examiner

*Primary Examiner*—David Bagnell
*Assistant Examiner*—Jennifer R. Dougherty
(74) *Attorney, Agent, or Firm*—R. William Graham

(57) ABSTRACT

A well production apparatus is provided for a well having a pressure control device operatively associated with the well for controlling pressure within the apparatus and well, wherein the apparatus includes a buoyant tubing member of a sufficient diameter to contain a submersible pump therein which is connected to a compressor. The apparatus further includes a gas fluids separator in the casing of the well. A fluids composition sensor and transmitter are provided for aiding in operating the apparatus.

4 Claims, 8 Drawing Sheets

WELL PRODUCTION APPARATUS

BACKGROUND OF THE INVENTION

1. Field of the Invention

The present invention relates to an apparatus for enhancing fluid and gas recovery from a well. In particular, the invention relates to enhancing oil and gas recovery from a well in an environmentally friendly manner.

2. Related Art

It is of some importance to discuss the background of the oil and gas recovery process in order to best appreciate the invention. An oil or gas pool requires a reservoir rock that is porous and permeable and a trap to contain the oil or gas. The oil or gas travels from its source into and through the reservoir rock to the trap.

The trap usually is an impermeable rock which encloses above the reservoir rock. Due to buoyancy and time, the less dense oil or gas migrates to the top of the trap, displaces the salt water, and remains in the trap. Thus, several layers form including gas at the top, then light oils, heavier oils, oil and saltwater mixtures and saltwater at the bottom.

Each well has inherent flow characteristics. The type of trap and geographical formation make up part of the natural flow characteristics of a pool of gas and oil. Common types of traps are dome, structural traps (created by relationships involving faults), and stratigraphic traps (resulting from variations in the layers, or strata).

Sedimentary rock usually forms reservoir rocks under certain conditions. Most reservoir rocks consist of sandstone or limestone due to their permeable and porous characteristics.

Most wells are drilled via a rotary bit method as is known in the art. When the drilling reaches oil-bearing formations the limits of the field are determined via formation samples and running well logs, a casing pipe is installed with production piping lowered into the casing which is used to withdraw the fluids through perforations in the casing.

Initially, the rate of the flow and the pressure and volume of the well are controlled by special pipings and gate valves—called a "Christmas tree"—installed above ground. Production begins when the optimal depth of the well is determined, at which point the pump is set to such depth to allow optimum exploitation of the well. The recovery of oil and gas requires the use of separation equipment. Natural gas must be separated from the liquid petroleum and salt water.

Initial production is usually through the mechanism of primary recovery, wherein the oil and gas field's own pressure drives the oil or gas to the surface. Over time, the pressure in the field drops. The oil must be pumped up to maintain production levels and difficulty resides in knowing what depth and for how long the pumping must be maintained for economic viability. A common drawback is that pumping the well causes removal of unwanted saltwater from the well because it has a tendency to mix with the oil and gas as it enters the perforations in the casing as the reservoir decreases. While some of the gas is utilized in conventional methods, a great deal of gas is wasted and placed into the atmosphere during the separation process due to their design as illustrated in FIG. 4.

Presently, about one-quarter to one-third of the oil is recovered through pumping, depending on the characteristics of the field. Natural gas recovery is usually much higher due to its natural properties of removal.

Expensive secondary and tertiary recovery methods are employed to increase recovery. Secondary recovery injects water or gas into the field to restore pressure and increase the proportion of petroleum removed from the field. Tertiary recovery injects steam, acids, carbon dioxide, detergents into the well to heat the oil, especially where it is "heavy" and flows poorly. These methods are not as desirable as primary methods.

It is desirable to employ less expensive recovery techniques while maximizing recovery in an environmentally acceptable manner. There exists a need for removing oil and gas from a reservoir in a manner such that the reservoir water substantially remains in the well. There is also a need to reduce waste of natural resources.

BRIEF SUMMARY OF THE INVENTION

It is an object to enhance oil and gas recovery from a well.

It is a further object to reduce expenses associated with oil and gas recovery.

It is another object to prevent theft or loss of oil and gas from the well site.

It is still another object to recover oil and gas in an environmentally acceptable manner.

It is yet another object to reduce waste of natural resources.

Accordingly, the present invention is directed to an apparatus for use in a well having a pressure control device operatively associated with the well for controlling pressure within the apparatus and the well. The pressure control device includes, but is not limited to, a compressor and submersible pump operably connected thereto.

The apparatus further includes a buoyant tubing member of a diameter to fit within casing of the well yet contain the submersible pump therein. The tubing member has an enclosed first end positionable down hole and includes a plug axially displaced from the first end and sealably disposed in the tubing member forming an air chamber between the first end and the plug. The tubing member has an open second end and preferably includes a plurality of orifices in a side adjacent the second end. Further, the tubing member includes a fluids composition sensor and transmitter connected thereto for transmitting a signal indicative of fluid composition. The apparatus includes a receiver operably disposed in the well which receives the signal and is connected to a computer-based device for manipulating the signal and generating a control output for controlling the pressure in the well via the compressor. The apparatus further includes a gas fluids separator in the casing of the well.

A method of enhancing oil and gas recovery in a conventional well is provided, wherein the well has a fluid zone of a first heavier density, another fluid zone of a second lighter and gas zone of a lighter density than said fluid zone densities, and wherein the well has perforated casing disposed in the well, production piping disposed in the casing, a submersible pump disposed in said casing which is operatively connected to the production piping. The method includes the steps of carrying out a first phase of separating heavier fluids from lighter fluids in casing of a well, and pumping first phase fluids from the casing, wherein the first phase fluids include in large part lighter fluids with smaller part heavier fluids.

Other objects and advantages will be readily apparent to those skilled in the art upon viewing the drawings and reading the detailed description hereafter.

DETAILED DESCRIPTION OF THE INVENTION

Figure 1:
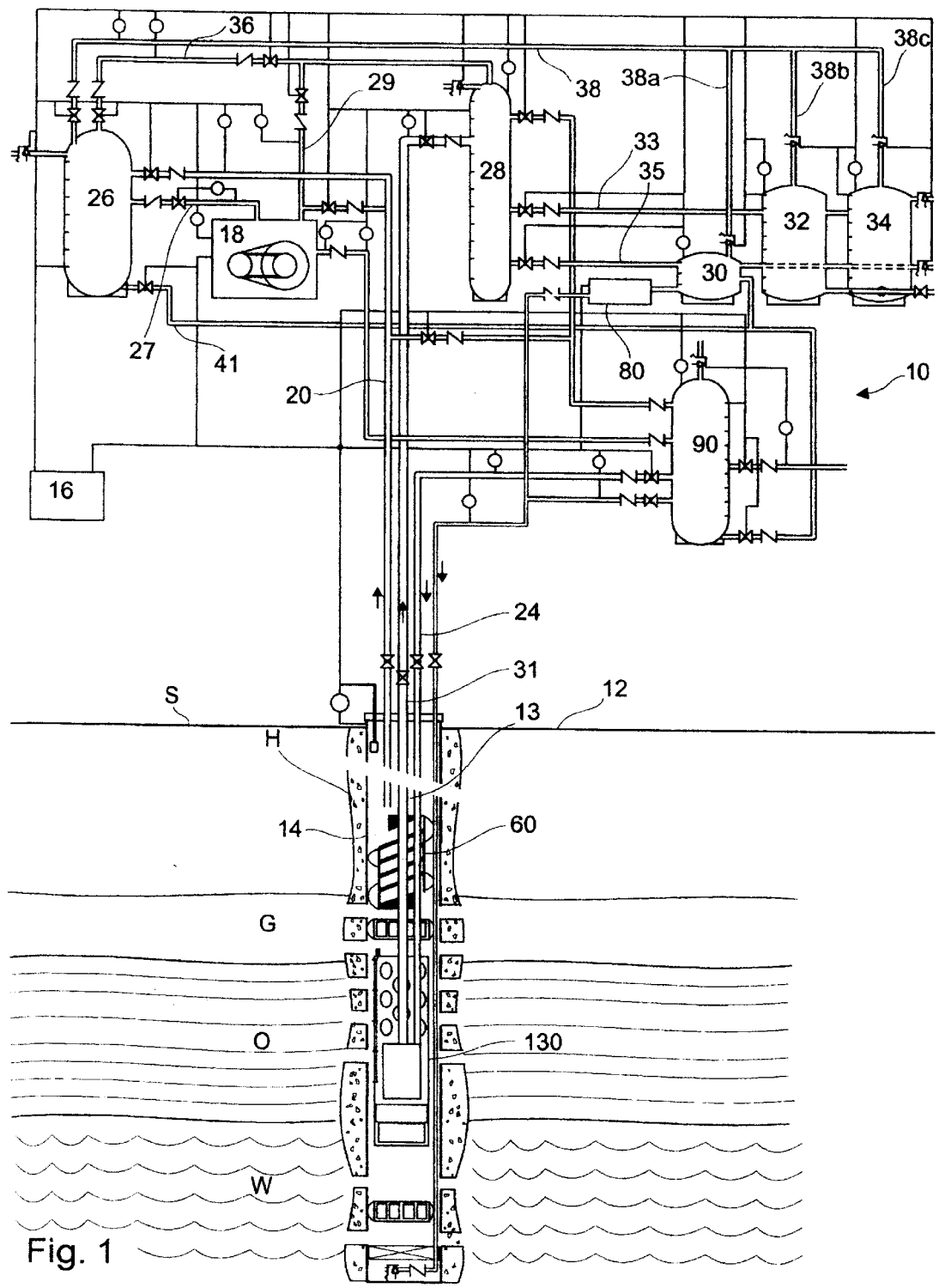
FIG. 1 is a schematic of an embodiment of the present invention employed in an existing well site.
Figure 1A:
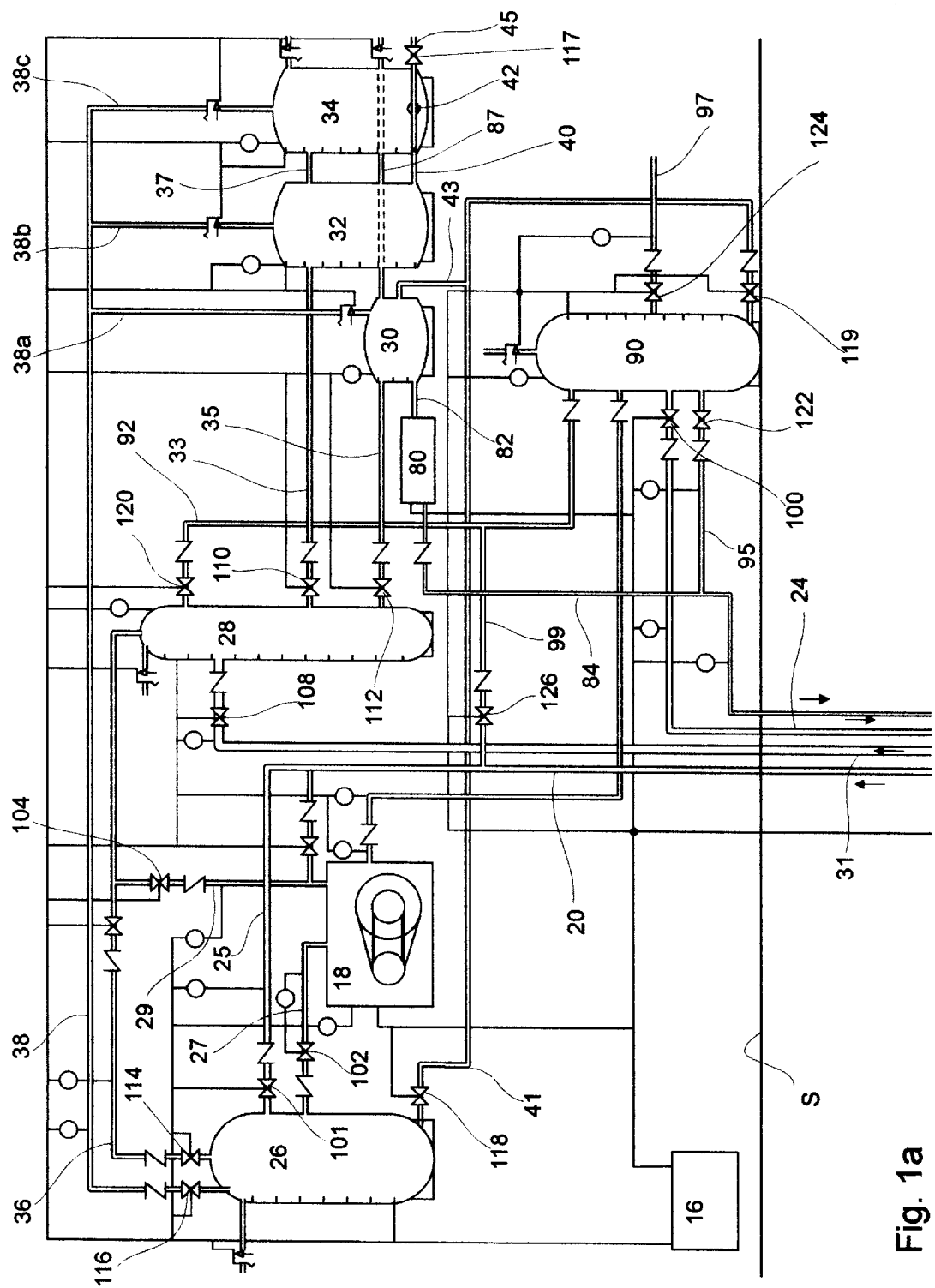
FIG. 1a shows a part of FIG. 1 in an enlarged manner.
Figure 1B:
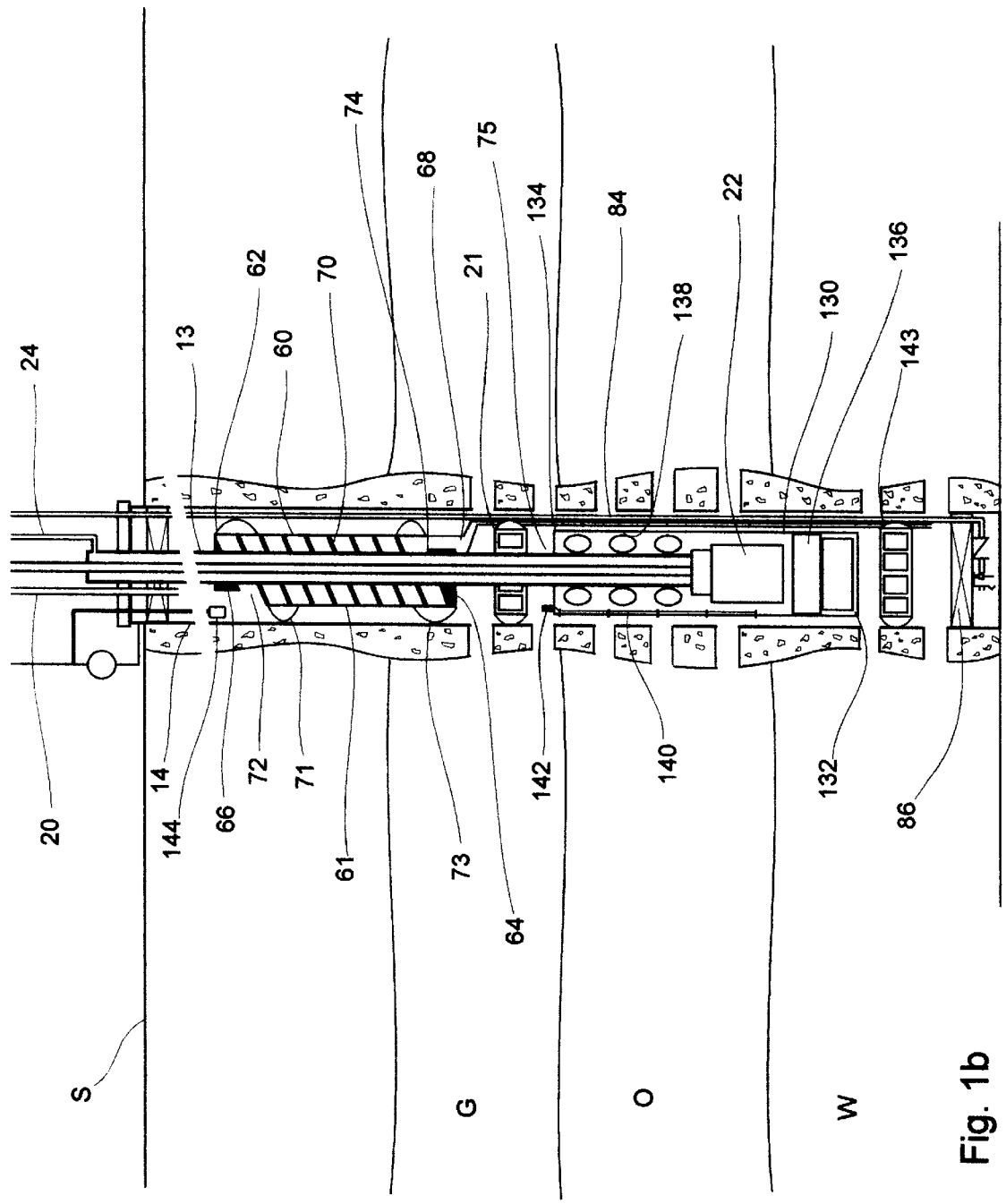
FIG. 1b shows another part of FIG. 1 in an enlarged manner.
Figure 2:
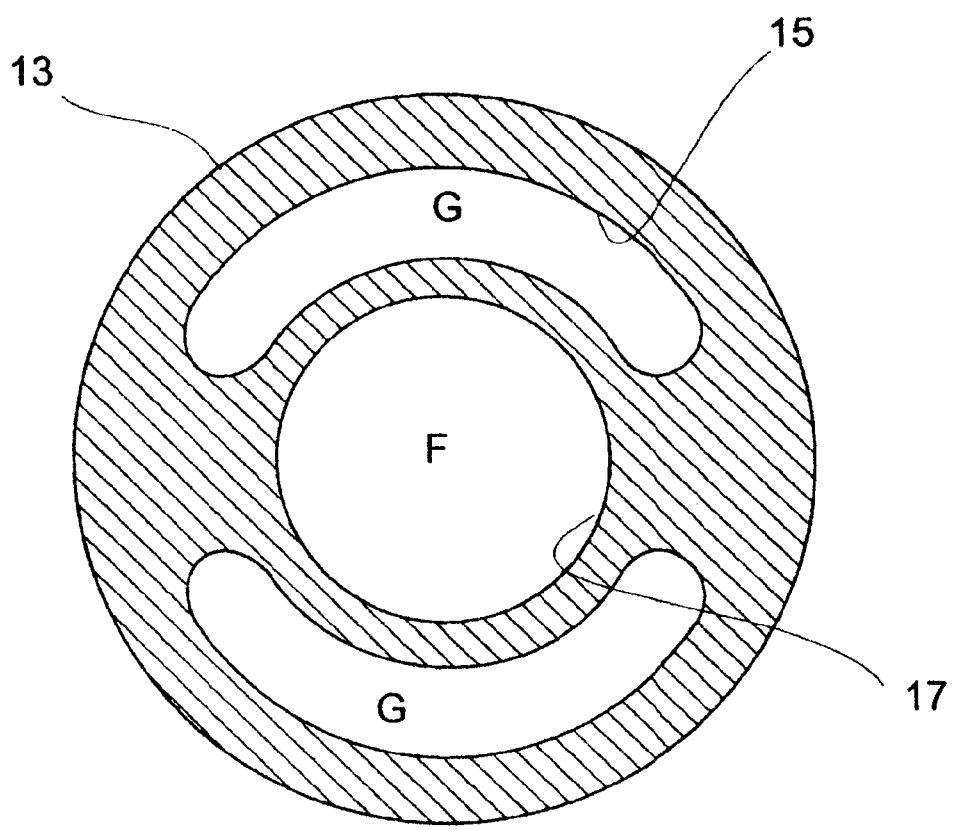
FIG. 2 is a cross section of a production piping used in the present invention.

Referring to the drawings in FIGS. 1, 1a, 1b and 2, an embodiment well production apparatus is generally referred to by the numeral 10 and is employed at an oil and gas well site 12. Existing at the well site 12 there is a casing 14 disposed in a hole H. Production piping 13 is disposed in the casing 14. The production piping 13 has annular channels 15 (FIG. 2) which communicate with conduit 24 which in turn connects to gas pressure tank 90. The production piping 13 extends into the casing 14 through a packer (not shown) and centralizer 21 to connect to a submersible pump 22.

Below the surface S, there exist many types of geological formations, but in the case of an oil and gas formation, there exists a field of production which includes gas G, oil O and salt water W. Gas G is mainly found in the gas formation zone. Oil O is mainly found in the oil bearing zone below the gas G and salt water W in the salt water formation zone below the oil O.

A controller 16 is provided on the surface S which includes a computer based device with operating software thereon which is used to operate the apparatus 10 at the well site 12. The controller 16 is typically equipped with a communications link, such as a modem conduit, such that remote control of the controller 16 is available as well as exchange of information concerning the function of the apparatus 10 and characteristics of the well site 12. In this regard, the controller 16 includes software to detect theft and/or parts failure and generate a communications signal to a remote location for immediate dispatching of personnel.

A compressor 18 is provided and operatively connected to the controller 16 and to the pump 22. As will be apparent by the description herein, the controller 16 can cause the compressor 18 to change pressure within the apparatus 10 and for example, remove or add gas G from and to the casing 14 thus affecting level of fluids, particularly oil, in the formation as well as aiding in separation of fluids. The compressor 18 is connected to a gas vacuum tank 26 via conduit 27, to conduit 36 via conduit 29, and to conduit 20 via conduit 25.

The gas vacuum tank 26 is communicably connected to an oil, gas and water separator 28, salt water tank 30, oil tanks 32 and 34, gas pressure tank 90 via conduits 36, 38, 38a, 38b and 38c, and (20, 99, 92 and 41), respectively, which connect to upper portions thereof. The gas vacuum tank 26 is used in conjunction with the compressor 18 and controller 16 to effect pressure differentials in the apparatus 10 and casing 14.

The oil, gas and water separator 28 is also communicably connected to the casing 14 via conduit 31 which communicably connects to a production tubing 17 (see FIG. 2) in the production piping 13. The production tubing 17 communicably connects to the submersible pump 22. The oil, gas and water separator 28 further communicably connects to oil tank 32 via conduit 33 extending from a mid portion of the oil, gas and water separator 28 and to salt water tank 30 via conduit 35 extending from a lower portion of the oil, gas and water separator 28. The oil, gas and water separator 28 also connects to gas pressure tank 90 via conduit 92. As fluids, which by use of the present invention are predominantly oil and gas, are pumped into the oil, gas and water separator 28, the separator 28 uses a heating process which causes substantial first phase separation. This phase separated gas is stored in gas pressure tank 90, separated oil is stored in oil tanks 32 and 34 and separated salt water is stored in tank 30.

Oil tanks 32 and 34 are communicably interconnected via conduit 37. The oil tanks 32 and 34 have a outlet ports 40 and 42, respectively, which connect to an oil sales conduit 45. The oil tanks 32 and 34 will undergo further separation of oil and gas, whereby the evolving gas in another phase separation is aided via a vacuum created by the compressor 18 in the apparatus 10 and is controlled by controller 16. In this regard, the gas is moved through the conduit 38 and is directed to gas pressure tank 90.

The gas pressure tank 90 and gas vacuum tank 26 connects to the salt water tank 30 via conduits 43 and 41. This allows removal of the fluids from the tanks 26 and 90 and returns the fluids back into the well casing 14 where they can separate. In a similar manner, another phase separation of emanating gas can be moved through the conduit 38 and directed to the tank 90.

A salt water pump 80 is connected to the salt water tank 30 via conduit 82. One end of a conduit 84 communicably connects to the salt water pump 80 and another end extends into the casing 14, through packer (not shown), centralizers 21 and 143 and terminates below a packer 86 disposed in the bottom of the casing 14. The salt water tank 30 has an outlet conduit 87 for draining the same. By way of the controller 16 and pump 80, the salt water can be pumped back into the salt water formation zone.

The compressor 18 is powered by a natural gas powered engine which is fueled by gas emanating from the casing 14. The compressor 18 functions to remove low pressure gas G from is the gas formation zone, raise level of oil O in the oil bearing zone and in the casing 14, and aid oil, gas and water separation by creating a vacuum in the apparatus 10 and causing flow of gas to the gas vacuum tank 26 and ultimately into the gas pressure tank 90. Subsequently, the controller 16 uses the compressor 18 is used to increase pressure to deliver gas from the gas pressure tank 90 to a sales pipe conduit 97.

Conduit 20 is operably connected to controller 16. Each of the conduits 24, 25, 27, 29, 31, 33, 35, 36, 38, 41, 45, 47, 87, 92, 95, 97, 99 is equipped with a control valve 100, 101, 102, 104, 108, 110, 112, 114, 116, 118, 117, 119, 115, 120, 122, 124 and 126, respectively, which are operably connected to the controller 16. The controller 16 actuates open and closed the valves 106, 100, 101, 102, 104, 108, 110, 112, 114, 116, (118 and 119), 117, 115, 120, 122, 124 and 126 to perform a function, e.g., creating a vacuum or generating additional pressure in the casing 14. Any inoperability or unauthorized opening or closing of flow in apparatus 10 will trigger the controller 16 to send a signal indicating the need to dispatch personnel. Additionally, the controller 16 is equipped with an automatic log software which will periodically transmit a status signal to the remote site. If the no signal is received, personnel can be dispatched accordingly.

A gas fluids separator 60 is provided in the well casing 14 above the gas formation zone. The gas fluids separator 60 includes an annular housing 61 having ends 62 and 64. Each of the ends 62 and 64 is equipped with clamps 66 and 68, respectively, for securing the gas fluids separator 60 to the production piping 13. Spring type casing seals 71 and 73 are disposed about the housing 61 adjacent the ends 62 and 64 to prevent gas and fluids from passing between the housing 61 and the casing 14.

Within the housing 61 is a spiral baffle 70 which extends therethrough and terminates adjacent open surfaces 72 and 74 of ends 62 and 64, respectively. The open surface 72 permit the escape of gas G while the open surface 74 connects to a water drainage pipe 75 which extends into the fluids formation zone. The spiral baffle 70 has an end (not shown) which terminates adjacent the open surface 74. Thus, as the gas G leaves the well 12 through conduit 20, the fluids are maintained within the casing 14 via the gas fluids separator 60.

The apparatus 10 further includes a buoyant tubing member 130 of a diameter to fit within casing 14 yet movably contain the submersible pump 22 therein. The tubing member 130 is preferably made of a plastic material, such as PVC, which is less dense and hence lighter than water W. The tubing member 130 has an enclosed first end 132 positionable down hole and includes a plug 136 axially displaced from the first end 132 and sealably disposed in the tubing member 130 forming an air chamber 135 between the first end 132 and the plug 136 to aid in buoyancy. The tubing member 130 has an open second end 134 which includes a plurality of orifices 138 in a side of the tubular member 130 adjacent the second end 134. These orifices 138 are located in an upper portion of the tubing member 130 so that substantially only oils pass into the pump 22 by virtue of tubular member 130 remaining buoyant in the water though oil fills within the tubular member 130.

Further, the tubing member 130 includes a fluids composition sensors 140 which are longitudinally spaced along the side of the tubular member 130 and operatively coupled to a transmitter 142 on the tubular member 130. The transmitter 142 includes means for transmitting a signal indicative of the fluid composition.

The apparatus 10 includes a receiver 144 operably disposed in the casing 14 which receives the signal from the transmitter 142 and is connected to the controller 16. The controller 16 includes software for manipulating the signal and generating a control output for controlling the pressure in the casing 14 and/or pumping to achieve maximum flow rates.

Figure 3:
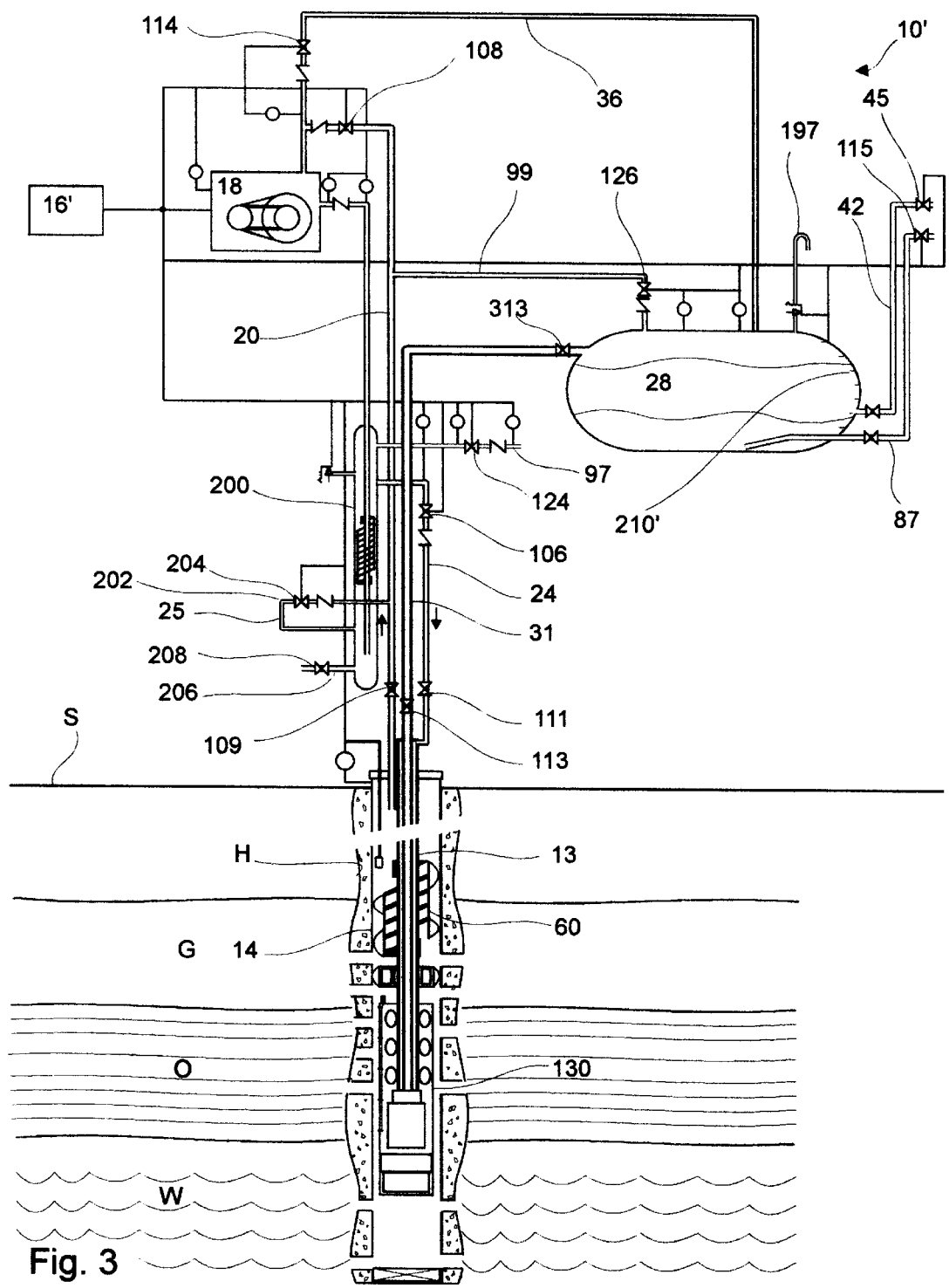
FIG. 3 is a schematic of another embodiment of the present invention employed in an existing well site.
Figure 3A:
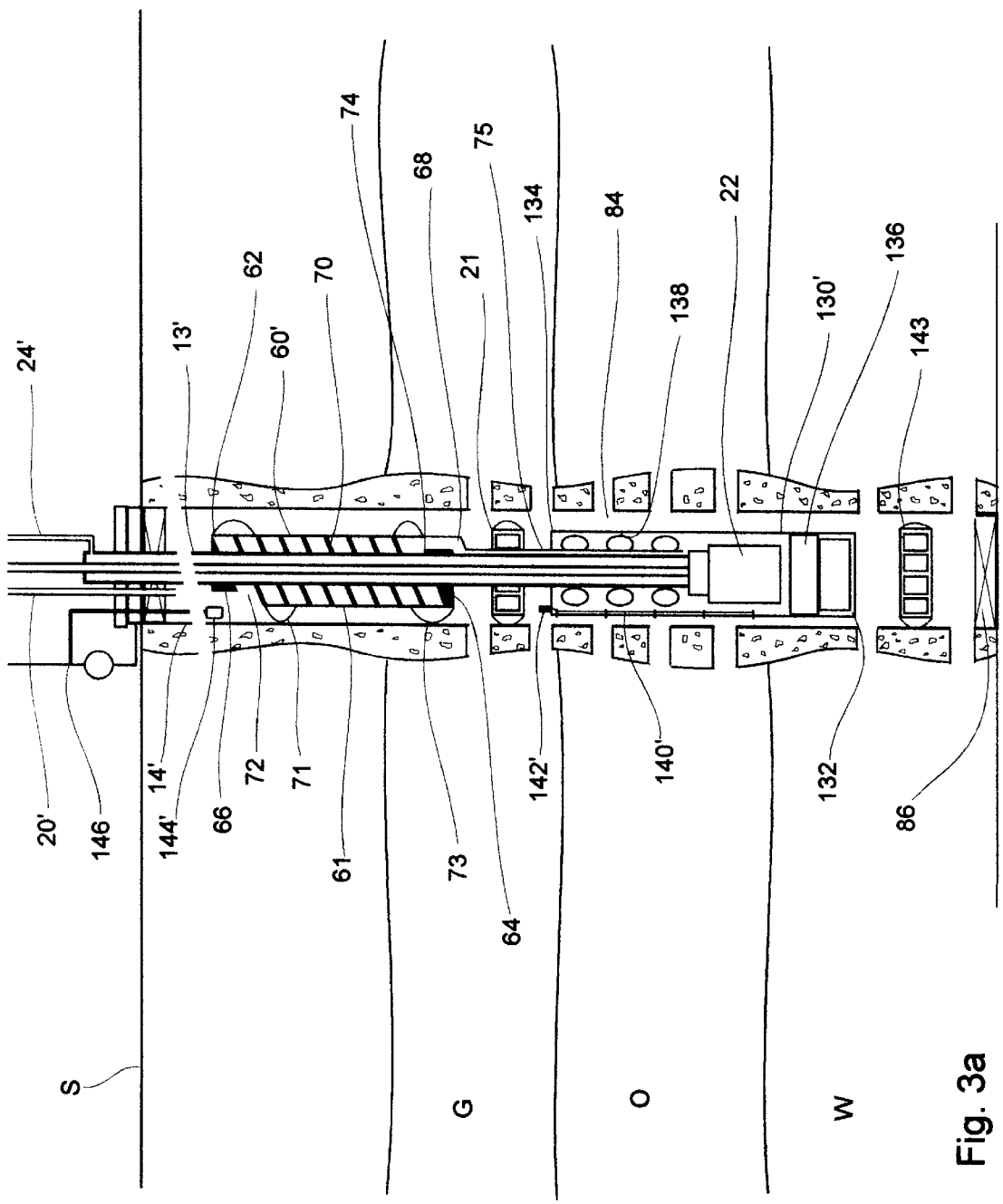
FIG. 3a shows a part of FIG. 3 in an enlarged manner.
Figure 3B:
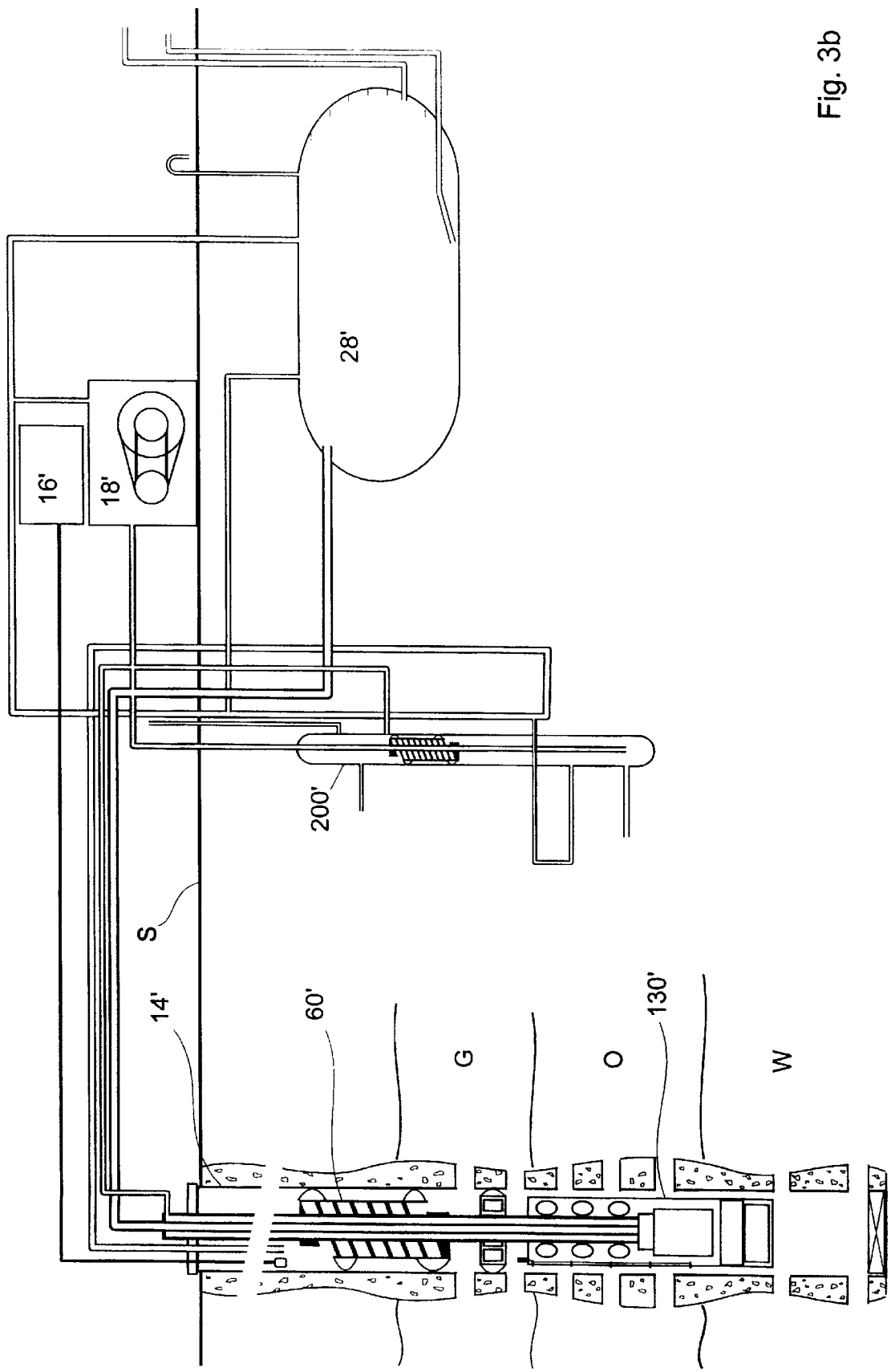
FIG. 3b shows physical relationship of parts of FIG. 3.
Figure 4:
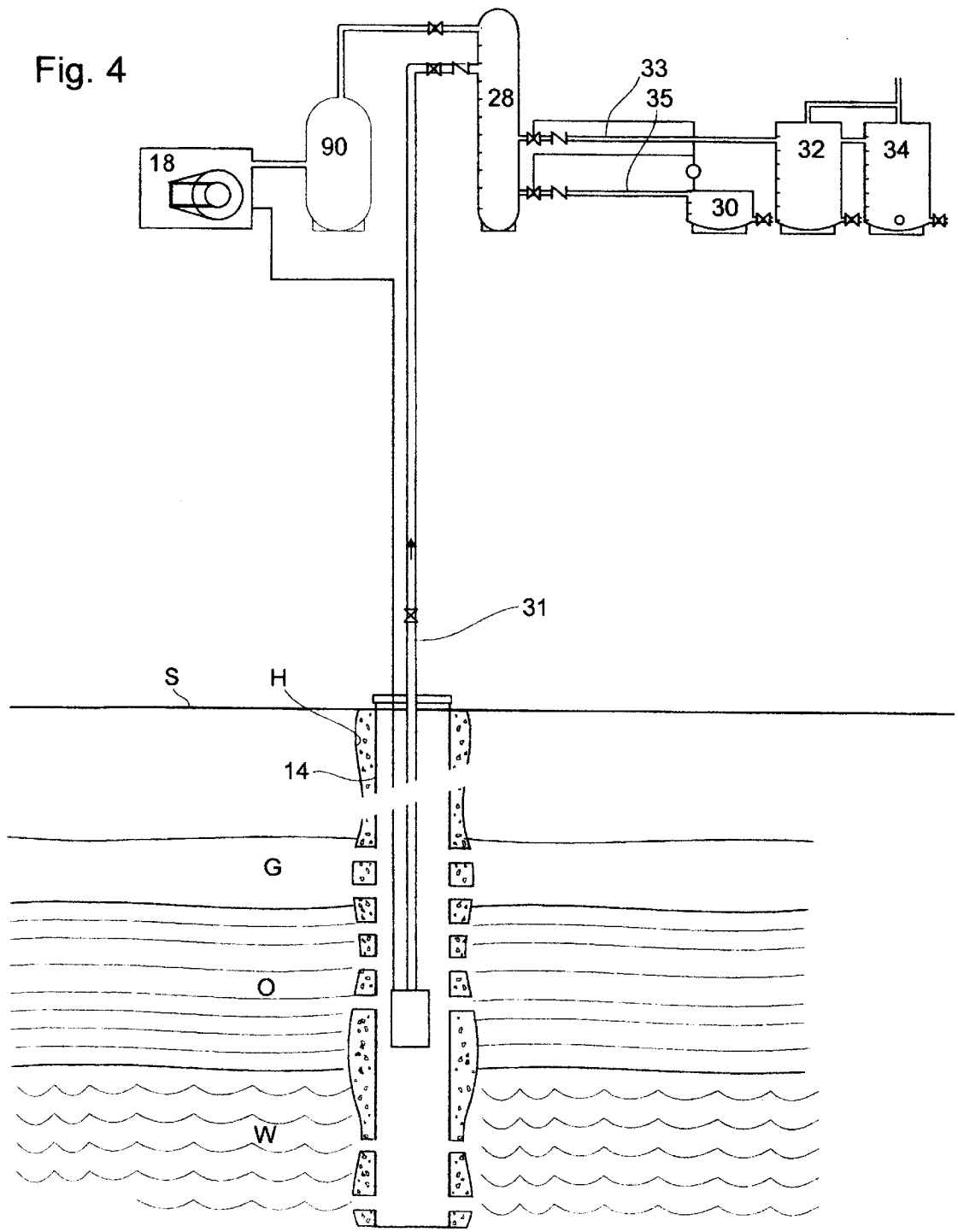
FIG. 4 depicts a prior art in the field.

The embodiment shown in FIGS. 3, 3a and 3b is directed to an apparatus 10' which improves upon existing separation equipment currently employed in the field. Here, an oil, gas and water separator 28' is disposed below the surface S. The oil, gas and water separator 28' is large enough to serve as a holding tank for all fluids and gas. By disposing the oil, gas and water separator 28' sufficiently below the surface say for example, two to ten feet, the underground temperature serves to cools the fluids and gas sufficiently to cause separation. The gas is removed from the oil, gas and water separator 28' by applying a vacuum to the separator 28' with the compressor 18'. Additional heating elements may also be employed to further increase separation if necessary, but these are believed to be minimal. An oil sales conduit 42' is communicably connected to a mid section of the oil, gas and water separator 28' and includes a control valve 45'. A salt water conduit 87' is communicably connected to a bottom portion of the oil, gas and water separator 28' and includes a valve 115'.

A gas conduit 20' extends from casing 14' as in a similar manner as described, with exception that the gas conduit 20' extends to communicably connect with conduit 36' and has control valves 108' and 109' therein. A conduit 99' communicably connects another top portion of oil, gas and water separator 28' and conduit 20' and includes a control valve 126' therein. A vent conduit 197' is communicably connected to a top of the tank 28'.

A fluids conduit 31' communicably connects to an upper portion of the oil, gas and water separator 28' and communicably connects to a production tubing 17' of a production piping 13' in a similar manner as described above. The fluids conduit 31' includes a control valves 113' and 313' which are operably connected to the controller 16'.

A compressor 18' is operatively disposed on the surface S of the well site. The compressor 18' is communicably connected to the oil, gas and water separator 28' via a conduit 36' having a control valve 114' therein. The compressor 18' is also communicably connected to an underground pressure pipe 200' via a conduit 93'.

A gas sales conduit 97' connects to an upper portion of the pressure pipe 200' and includes a control valve 124'. Another conduit 24' communicably interconnects to a mid-portion of pressure pipe 200' and a channel 15' of the production piping 13' and includes control valves 106' and 111' which are connected to the controller 16'. Yet another conduit 202' communicably interconnects a lower portion of the pressure pipe 200' and the conduit 20' between the valves 108' and 109' in conduit 20', and the conduit 202' includes a control valve 204'. A conduit 206' having a control valve 208' therein connects to a bottom portion of the pressure pipe 200' to a sump.

A controller 16' is operably disposed on the surface S'. The controller 16' is operably connected to the control valves 45', 106', 108', 109', 111', 113', 114', 115', 126', 204', 208' to control flow in a similar manner as stated above to control pressure within the apparatus 10' and well casing 14' to increase production in a more economical manner.

The apparatus 10' also includes a tubular member 130' and gas fluids separator 60' which operate in a manner as described above. Fluid composition sensors 140', transmitter 142' and receiver 144' are also provided and are operatively connected in a manner as described above.

A method of enhancing oil and gas recovery in a conventional well is provided. The method is used for a well having a fluid zone of a first heavier density, another fluid zone of a second lighter and gas zone of a lighter density than said fluid zone densities, wherein the well has perforated casing disposed in the well, production piping disposed in the casing, and a submersible pump disposed in said casing which is operatively connected to the production piping. The steps include carrying out a first phase of separating heavier fluids from lighter fluids in casing of a well and pumping first phase fluids from the casing, wherein the first phase fluids include in large part lighter fluids with smaller part heavier fluids. The method further calls for the steps of monitoring fluids composition in the casing of the well and controlling the pumping step in accordance with the monitoring.

Also, provided is the step of carrying out a second phase of separating heavier fluids from lighter fluids and transferring second phase heavier fluids back into the casing. Carrying out first phase of separating of types of fluids as well as fluids from gas is done in the casing of a well, wherein the first phase gas include in large part gas with smaller part fluids and first phase fluids include varying densities of fluids in large part lighter density than that remaining in the well. A second phase of separating gas from fluids is performed outside of the casing, wherein fluids and gas may be transferred gas back into the casing or disposed of as desired.

By so providing, the present invention increases recovery, reduces waste of natural resources and costs of production. The above described embodiment are set forth by way of example and is not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. An apparatus for use in recovering gas and fluids from a well having a fluid zone of
    a first heavier density, another fluid zone of a second lighter density and a gas zone of a lighter density than said fluid zone densities, and wherein the well has perforated casing disposed in the well, production piping disposed in the casing, a submersible pump disposed in said casing which is operatively connected to the production piping, which includes:
    a tubular member having an enclosed first end and disposal down hole in the casing and an open second end disposed up-hole from said first end, wherein said tubular member us of a diameter to be movably disposed within the casting and operably contain the submersible pump therein, and wherein said tubular member is of a buoyancy such that said tubular member
    means for sensing fluids composition in said casing and generating a signal in response to said sensed fluid composition.

2. The apparatus of claim 1, wherein said tubular member includes a plug axially displaced from said first end and sealably disposed in said tubing member forming an air chamber between said first end and said plug creating a float aspect to said tubular member.

3. The apparatus of claim 1, wherein said tubular member includes a plurality of orifices in a side adjacent said second end.

4. The apparatus of claim 1, which further includes means for receiving said signal and controlling the submersible pump as a function of sensed fluid composition.

* * * * *

UNITED STATES PATENT AND TRADEMARK OFFICE
CERTIFICATE OF CORRECTION

PATENT NO. : 6,234,248 B1
DATED : May 22, 2001
INVENTOR(S) : Roy F. Knight

Page 1 of 1

It is certified that error appears in the above-identified patent and that said Letters Patent is hereby corrected as shown below:

Column 3,
Line 21, "(FIG. 2)" is changed to -- (see FIG. 2) --.

Column 6,
Line 9, "17'" is changed to -- 17 --.
Line 23, "15'" is changed to -- 15 --.

Column 8,
Line 4, (Claim 1), "us" is changed to -- is --.

Signed and Sealed this

Thirteenth Day of November, 2001

Attest:

NICHOLAS P. GODICI
Attesting Officer
*Acting Director of the United States Patent and Trademark Office*